United States Patent [19]

White et al.

[11] Patent Number: 4,764,023

[45] Date of Patent: Aug. 16, 1988

[54] HEAT TRANSFER RATE MEASUREMENT USING THE OPTICAL PROPERTIES OF A DISSOLVING COATING

[75] Inventors: William J. White, Warrington; Donald B. Utton, Cheshire, both of England

[73] Assignee: National Nuclear Corporation Limited, England

[21] Appl. No.: 919,227

[22] Filed: Oct. 15, 1986

[30] Foreign Application Priority Data

Oct. 21, 1985 [GB] United Kingdom ............... 8525906

[51] Int. Cl.$^4$ ...................... G01K 17/00; G01N 25/18
[52] U.S. Cl. ...................................... 374/29; 356/43; 374/43; 374/54; 374/135
[58] Field of Search .................. 374/17, 7, 32, 135; 356/382; 250/429

[56] References Cited

U.S. PATENT DOCUMENTS

| | | | |
|---|---|---|---|
| 3,017,512 | 1/1962 | Wolbert | 356/382 X |
| 3,064,135 | 11/1962 | Roetter et al. | 374/17 X |
| 3,174,824 | 3/1965 | Lupfer | 374/17 X |
| 3,544,222 | 12/1970 | Jannasch et al. | 356/382 |
| 3,869,215 | 3/1975 | Nolan | 250/429 X |
| 3,982,420 | 9/1976 | Blevins et al. | 374/17 |
| 4,320,967 | 3/1982 | Edgar | 356/382 |
| 4,431,315 | 2/1984 | Utton et al. | 374/54 x |
| 4,676,883 | 6/1987 | Nelson et al. | 356/382 X |

Primary Examiner—Daniel M. Yasich
Attorney, Agent, or Firm—Kirschstein, Kirschstein, Ottinger & Israel

[57] ABSTRACT

In a method of determining the rate of heat transfer from a surface due to liquid convection, a coating of a material capable of dissolving in the convecting liquid and whose optical properties on irradiation are proportional to the thickness of the coating, is applied to the surface and is then exposed to radiation and to the convecting liquid, the change in the amount of radiation transmitted or reflected from the coating giving an indication of the rate of heat transfer.

13 Claims, 2 Drawing Sheets

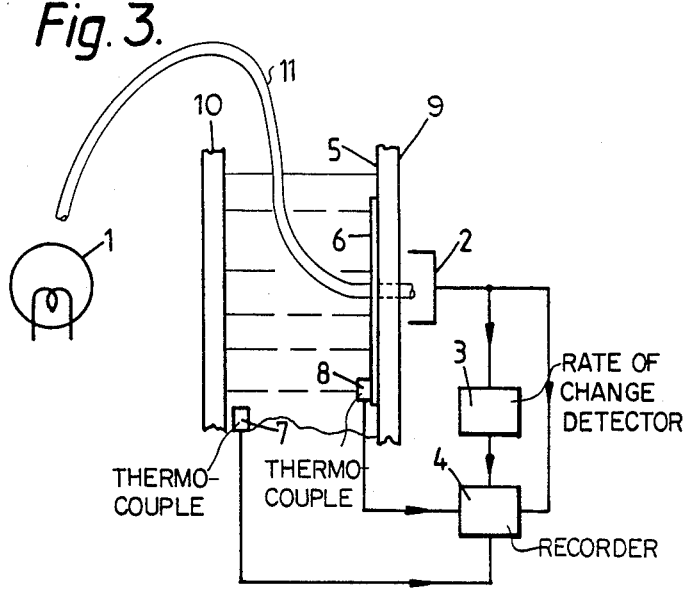
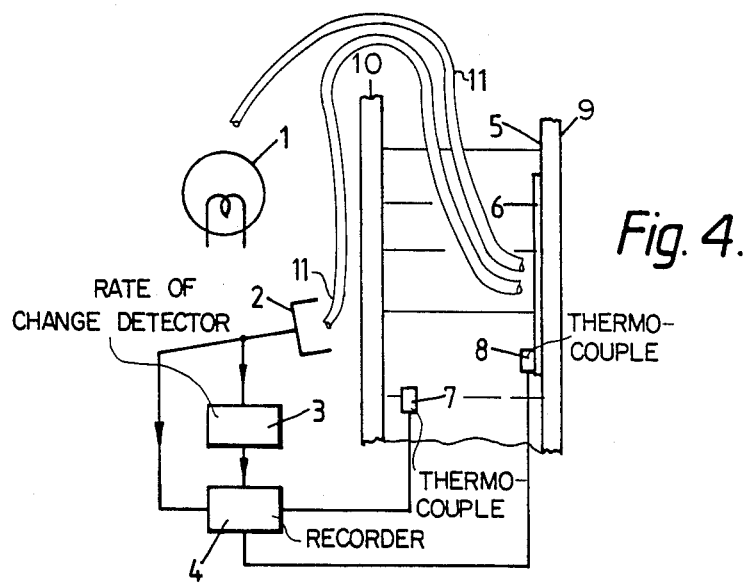

HEAT TRANSFER RATE MEASUREMENT USING THE OPTICAL PROPERTIES OF A DISSOLVING COATING

BACKGROUND OF THE INVENTION

1. Field of the Invention

This invention relates to a method of measuring heat transfer rate from a surface due to fluid convection, and to apparatus for carrying out said method.

2. Description of the Prior Art

Commonly used methods of measuring rates of heat transfer from surfaces as a result of fluid convection have involved a considerable number of temperature measurements and complex calculations, and it has accordingly been proposed to attach to such a surface a liquid absorbent material whose transmissive or reflective properties for certain radiations vary with the liquid content of the material, wetting the sheet of material with a liquid which evaporates on the passage of the convecting fluid, exposing the sheet to said radiation and to the convecting fluid, and detecting the change in the amount of radiation transmitted through or reflected from the sheet.

In this latter method the variation in the transmission or reflection of the radiation in a given time gives a ready indication of the rate of heat transfer. Such a method is particularly suitable in cases where the convecting fluid is a gas, but it is not so convenient in cases where the heat transfer takes place due to convection in a liquid. In addition, this method can only be used when the surface, from which heat transfer is to be measured, is completely immersed in the convecting liquid.

SUMMARY OF THE INVENTION

Accordingly an object of the present invention is to provide an alternative yet similarly simple method of determining the rate of heat transfer from a surface due to liquid convection.

According, therefore, to one aspect of the present invention a method of determining the rate of heat transfer from a surface due to liquid convection comprises the steps of applying to said surface a coating of a material capable of dissolving in a convecting liquid, said material having optical properties which vary with the thickness of said coating when irradiated with radiation of a given wavelength or wavelengths, exposing said coating to electromagnetic radiation of said given wavelength or wavelengths and to the convecting liquids, and detecting the change in the amount of radiation emitted by the coating. The variable optical properties of said material may be either transmissive or reflective.

Preferably, in the case where the transmissive properties of the material vary, the surface to which the coating is applied will, in general, form part of a supporting wall which is itself transparent to radiation of the given wavelength or wavelengths. The detector may then be disposed so as to detect changes in the amount of radiation passing through the coating and the supporting wall.

However, if the reflective properties of the material are variable, the detector may then be disposed to detect changes in the amount of radiation passing twice through the coating thickness.

Preferably, the source of radiation is to be placed outside a vessel containing the surface, so that the walls of the vessel must be transparent to the radiation of said given wavelength or wavelengths.

Conveniently, the coating material has a transmission or reflection coefficient which is directly proportional to its thickness. The coating material should be one which dissolves at a suitably slow rate in the convecting liquid and where the latter is water, the coating material is conveniently a layer of sucrose, preferably with a thickness which does not exceed 0.5 mm. However other coating materials having appropriate properties may alternatively be employed.

Visible light is conveniently the radiation employed, the light source being arranged to illuminate the coating directly, or alternatively indirectly by means of an optical fibre or other suitable device. Similarly the light detector can either be positioned to receive the transmitted or reflected light directly, or be arranged to sense the light remotely by the use of an optical fibre or other light transmitting device. However radiations of other wavelengths may be used in place of visible light depending upon the reflective and/or transmissive properties of the coating material.

The rate of heat transfer has been found to be a function of the mass transfer rate, i.e. the rate at which the coating material is dissolved by the convecting liquid. Since the optical properties of the coating depend on the thickness of the coating, as the coating dissolves in the convecting liquid, the variation in the transmission or reflection of the radiation employed gives a ready indication of the rate of heat transfer. The determination of the heat transfer is thus effected in situ, is non-invasive, and is carried out in real time, and thus compares very favourably with previously used mass transfer methods in which materials have to be weighed or checked dimensionally after exposure to convecting liquids.

The invention includes within its scope apparatus for carrying out the method described.

BRIEF DESCRIPTION OF THE DRAWINGS

Four different ways of carrying out the method of the invention, and equipment for achieving this, will now be described by way of example with reference to FIGS. 1 2, 3 and 4 of the accompanying schematic drawing, in which:

FIG. 3 shows the arrangement of FIG. 1 in which the coating is illuminated indirectly; and FIG. 4 shows the arrangement of FIG. 2 in which the coating is illuminated indirectly.

DETAILED DESCRIPTION OF THE PREFERRED EMBODIMENT

Figure 1:
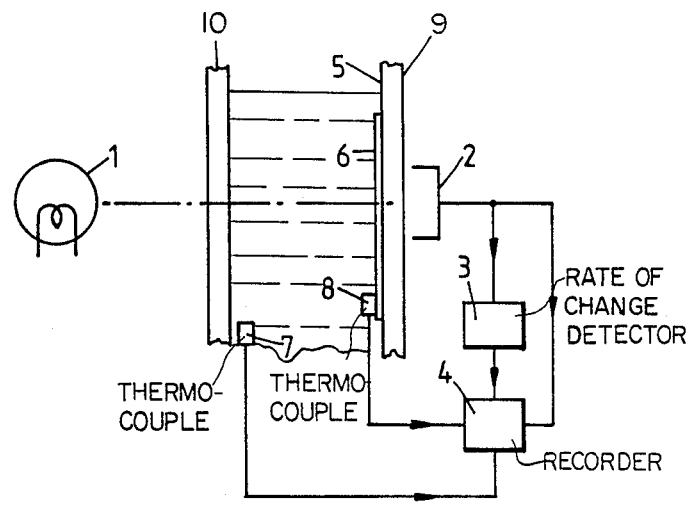
FIG. 1 is an embodiment of the invention in which the coating used has variable transmissive properties.

Referring first to FIG. 1, this shows the walls 9,10 of part of a vessel within which heat transfer by convection currents take place both of, the walls being fabricated from a clear transparent material such as "Perspex" (Registered Trade Mark). A light source 1, such as a tungsten incandescent lamp is mounted at one side of the vessel adjacent to the transparent wall 10, and a detector 2, such as a phototransistor responsive to light issuing from the source is located at the opposite side of the vessel, adjacent to the transparent wall 9. The output from the detector 2 is fed to a rate of change detector 3 which, in turn, feeds a recorder 4 of any convenient kind, the output from the detector 2 also being fed directly to the recorder. The surface 5 under investigation is formed on the inner surface of the supporting wall 9 and is coated with sucrose 6 to a thickness of not more than 0.5 mm, sucrose having a coefficient of light transmission proportional to its thickness. In use the detector 2 is placed against the outer surface of the transparent coated wall 9 so as to receive light from the light source 1 which is transmitted through the sucrose coating 6. The coated surface is exposed to a liquid, in this case water, which is capable of dissolving the coating material, and simulates the heat transfer convecting liquid, and thermocouples 7 and 8 are provided for measuring the temperature of the water and of the coating 6, the output also being fed to the recorder 4 or possibly to a separate recorder as may be convenient.

The change in the amount of light transmitted through the coating 6, together with the rate of change, give an indication of the rate at which the coating material is dissolved by the water, and from this the rate of heat transfer may readily be deduced.

In FIGS. 3 and 4 the light detector 2 is be arranged to sense the light remotely by the use of an optical fibre 11. The light source 1 illuminates the coating 6 indirectly by means of an optical fibre 11.

Figure 2:
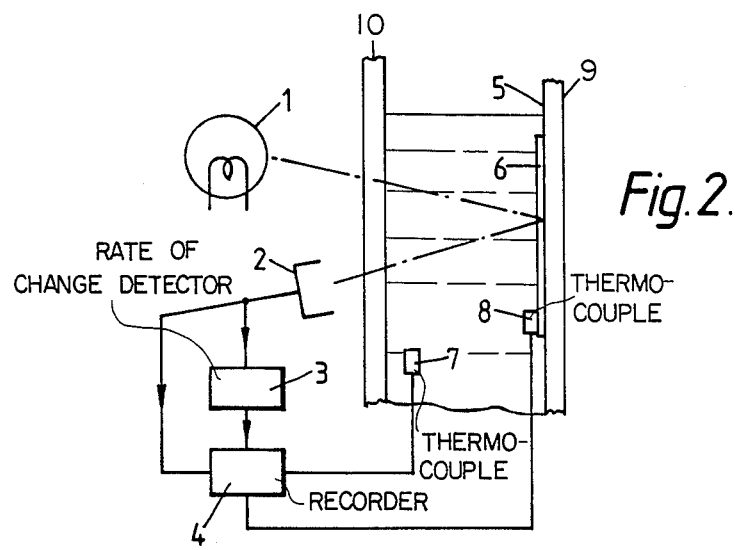
FIG. 2 is an embodiment of the invention in which the coating used has variable reflective properties.

In a modification of the arrangement above described in which light reflected from the coating 6 is dependent upon its thickness, the detector 2 is disposed on the same side of the coating as the light source, as shown in FIG. 2, the equipment being otherwise similar to that described above. A similar disposition of the detector 2 may be used where the surface 5 on which the coating is applied is itself light-reflective. The light from the lamp then passes twice through the transparent wall 10 and twice through the coating 6 on its way to the detector.

In a further modification, a second detector may be disposed to receive light from an uncoated surface adjacent to the coated surface 5, the outputs from the two detectors being fed to a difference amplifier which feeds a difference signal to the rate detector and also to the recorder. This difference technique has the advantage of reducing the effect of unwanted variations in the light source intensity and variations in the detector sensitivity, and hence reduces the scatter of the measurements.

This method can be used where the surface, from which heat transfer is to be measured, is only partially immersed in the convecting liquid. Also, variations in the rate of heat transfer can be measured at different positions in the vicinity of the surface.

We claim:

1. A method of determining the rate of heat transfer from a surface due to liquid convection, comprising the steps of:
   (a) applying to said surface a coating of a material which dissolves in a convecting liquid, said material having optical properties which vary with the thickness of the coating when irradiated with radiation of a selected at least one wavelength;
   (b) exposing said coating to said radiation, and to the convecting liquid; and
   (c) detecting the change in the amount of radiation passing through the coating.

2. A method according to claim 1 wherein the applying step is performed by providing said material with a variable transmissive optical property.

3. A method according to claim 2, in which said surface, to which the coating is applied, forms part of a supporting wall which is itself transparent to said radiation of said selected at least one wavelength, and wherein the detecting step is performed by detecting changes in the amount of radiation passing through the coating 6 and the supporting wall.

4. A method according to claim 2, wherein the applying step is performed by providing the coating material with a transmission coefficient which is directly proportional to its thickness.

5. A method according to claim 1, wherein the applying step is performed by providing said material with a variable reflective optical property.

6. A method according to claim 5 in which said surface, to which the coating is applied, is reflective to said radiation of said selected at least one wavelength, and wherein the detecting step is performed by detecting changes in the amount of radiation passing twice through the coating thickness.

7. A method according to claim 5, wherein the applying step is performed by providing the coating material with a reflection coefficient which is directly proportional to its thickness.

8. A method according to claim 1, wherein the exposing step is performed by providing a source of visible light which emits electromagnetic radiation.

9. A method according to claim 8, wherein the exposing step is performed by having the light source illuminate the coating directly.

10. A method according to claim 8, wherein the exposing step is performed by having the light source illuminate the coating through an optical fibre.

11. Apparatus for use in determining the rate of heat transfer from a surface as a result of convection of a liquid, comprising:
    (a) a material applied as a coating on said surface, and soluble in the liquid to reduce the thickness of said coating, said material having optical properties which vary with the thickness of the coating on irradiation with radiation of a selected at least one wavelength;
    (b) a source of radiation capable of directing radiation of a selected at least one wavelength onto said coating;
    (c) a detector capable of detecting the amount of radiation from said source which passes through the coating material;
    (d) means responsive to the detector for providing signals representative of the change and rate of change of the said radiation passing through said material; and
    (e) means for recording said signals.

12. Apparatus as claimed in claim 11, in which said material has variable, transmissive optical properties.

13. Apparatus as claimed in claim 11, in which said material has variable, reflective optical properties.

* * * * *